United States Patent [19]

Schouhamer Immink

[11] Patent Number: 4,641,128

[45] Date of Patent: Feb. 3, 1987

[54] METHOD OF ENCODING A STREAM OF DATA BITS, ARRANGEMENT FOR PERFORMING THE METHOD AND ARRANGEMENT FOR DECODING THE STREAM OF CHANNEL BITS OBTAINED IN ACCORDANCE WITH THIS METHOD

[75] Inventor: Kornelis A. Schouhamer Immink, Eindhoven, Netherlands

[73] Assignee: U.S. Philips Corporation, New York, N.Y.

[21] Appl. No.: 613,126

[22] Filed: May 23, 1984

[30] Foreign Application Priority Data

Jan. 24, 1984 [NL] Netherlands ........................ 8400212

[51] Int. Cl.$^4$ ............................................. H03M 5/14
[52] U.S. Cl. ................................ 340/347 DD; 360/40
[58] Field of Search .................. 340/347 DD; 360/40; 375/25, 106, 114–116

[56] References Cited

U.S. PATENT DOCUMENTS 4,501,000 2/1985 Immink ........................ 340/347 DD
4,536,742 8/1985 Immink ........................ 340/347 DD

OTHER PUBLICATIONS

Lewis "IBM Technical Disclosure Bulletin", vol. 13, No. 8, Jan. 1971, pp. 2241-2242.

Primary Examiner—Charles D. Miller
Attorney, Agent, or Firm—Thomas A. Briody; Jack Oisher; William J. Streeter

[57] ABSTRACT

Method of connecting a stream of data bits of a binary source signal into a stream of data bits of a binary channel signal. The data bit stream of the source signal is divided into a sequence of five authorized source words of variable lengths. Each of these five authorized source words are converted into a channel word having twice the number of data bits. This conversion has been chosen such that a very small error propagation is obtained and that at the same time very simple electronics are required. For dividing the data bit stream into information blocks and for providing the timing during the decoding operation a very suitable synchronizing word is used.

11 Claims, 13 Drawing Figures

METHOD OF ENCODING A STREAM OF DATA BITS, ARRANGEMENT FOR PERFORMING THE METHOD AND ARRANGEMENT FOR DECODING THE STREAM OF CHANNEL BITS OBTAINED IN ACCORDANCE WITH THIS METHOD

BACKGROUND OF THE INVENTION

The invention relates to a method of converting a stream of data bits of a binary source signal into a stream of channel bits of a binary channel signal in a transmission system, more specifically, a system for recording and reproducing a recording signal on a record carrier, the bit stream of the source signal being divided into a contiguous sequence of five authorized source words in accordance with the following Table, which authorized source words are converted into the associated channel words of the Table:

| Source words | Channel words |
| --- | --- |
| 10 | 0100 |
| 11 | 1000 |
| 0(1) | 00 |
| 00(1) | 0000 |
| 000 | 100100. |

The channel signal obtained in the manner described above is further subjected to what is commonly referred to as a NRZ-M modulation, that is to say, a binary signal is generated which evidences edges corresponding to the "1" bits of the channel signal.

Such a method is disclosed in Electronics Letters, Apr. 28th, 1983, Vol. 19 No. 9, page 323. In this encoding technique, the bit stream of the source signal is divided into a contiguous sequence of a limited number (5) of authorized source words of different lengths, and these different source words are converted into the associated channel words. This encoding technique excells as regards a number of properties which are particularly important for the recording on a record carrier, such as:

1. The minimum pitch between consecutive transitions in the channel signal is limited, so that the required frequency bandwidth is limited.
2. The maximum pitch between consecutive transitions in the channel signal is limited, so that the code is self-clocking, that is to say, that the clock signal required for decoding this channel code can be derived from the bit stream itself.
3. The decoding time window, that is to say, the duration of the time period within which the presence or absence of a signal transition in the channel code must be detected, is very acceptable.
4. The error propagation, that is to say, the number of incorrectly decoded data bits due to a single faulty channel bit, is very small.
5. The electronics required for coding and decoding is not complicated, which is very important, particularly for consumer uses.

As holds for any type of coding, also for the above-described code, the use of a synchronizing word is indispensable for dividing the channel bit stream into unambiguously identifiable information blocks. This synchronizing word must have a channel bit pattern which can unambiguously be identified in the stream of channel bits. On the other hand, it is of course advantageous for this synchronizing word to occupy as little space as possible of the available information space and moreover to require the least possible additional electronics, both in the encoding and in the decoding circuits.

A complication as regards the insertion of a synchronizing word in the above-mentioned code is the fact that because of the use of permissible source words of different lengths during encoding of the data bits preceding the beginning of a synchronizing word, use must be made of data bits which coincide with the first four channel bits of the synchronizing word, as will be explained in greater detail hereinafter. Also during decoding of the channel bits, the first four channel bits of the synchronizing word play a part in the decoding of the last two channel bits of the bit stream preceding the beginning of the synchronizing word. This imposes additional requirements on the pattern of this synchronizing word.

SUMMARY OF THE INVENTION

The invention has for its object to provide a synchronizing word which satisfies these requirements in a particularly advantageous manner. The invention is therefore characterized in that during this encoding operation, a synchronizing word is generated, formed by 16 channel bits, the two first and the two last channel bits of this synchronizing word being a logic "0", and the intermediate pattern of channel bits comprises only two logic "ones" separated by nine logic "zeros" and that in order to obtain an unambiguous conversion of the two source signal data bits preceding a synchronizing word, the beginning of a synchronizing word in the stream of data bits of the source signal is indicated by the insertion of at least one source bit in the form of a logic "0".

The unambiguous recognition of the synchronizing word results from the presence of a sequence of nine "zeros", which does not occur in the encoded channel signal.

The use of two first channel bits and two last channel bits with a pattern "00" accomplishes that the requirement, as regards the minimum distance between two consecutive transitions in the recording signal, remains satisfied without fail. By inserting the first data bit, having the logic value "0", into the source signal at the beginning of the synchronizing signal for the encoding of the preceding data bits of the source signal, accomplishes that also at the transition of encoded source words in the channel signal to the synchronizing word, the maximum number of consecutive "zeros" (eight) of the normal code is not exceeded, so that the synchronizing word is indeed unambiguously characterized, and remains so, with a sequence of nine "zeros".

Preferably, the method according to the invention is characterized in that to obtain an unambiguous conversion of the two source signal data bits preceding a synchronizing word, the beginning of a synchronizing word in the stream of data bits of the source signal is indicated by the insertion of a set of source bits formed by a logic "0" followed by a logic "1". The insertion of the second source bit, having the logic value "1", accomplishes that, in accordance with the coding rules, the first two channel bits of a synchronizing word correspond to the channel bits such as these bits are indeed generated, which is essential in the decoding of the channel bits. Finally, the choice of the last two channel bits of the synchronizing word, together with the requirement as regards the pattern of nine consecutive "0" bits in the synchronizing word, ensures that the synchronizing word terminates with an unambiguous pattern. The choice of "00" for the two first and the two last channel bits of the synchronizing word accomplishes that the requirement, as regards the minimum distance between consecutive transitions in the recording signal, remains satisfied without fail.

A first embodiment of the method according to the invention is characterized in that the synchronizing word is formed by the pattern of channel bits 0010000000001000.

A second embodiment is characterized in that the synchronizing word is formed by the pattern of channel bits 0001000000000100.

The synchronizing word can, of course, be inserted directly into the bit stream of a channel signal at the desired instance. To keep the electronics required in the encoding circuit as simple as possible, a further embodiment is characterized in that the synchronizing word is obtained by inserting a fixed pattern of eight data bits into the source signal, and by briefly modifying the coding rules during the conversion of this fixed pattern of source signal data bits into the desired pattern of the synchronizing word of the channel signal.

An arrangement for performing the method according to the invention, which arrangement comprises:

a first shift register for recording and shifting the data bits of the source signal with a first clock frequency, a second shift register for recording and shifting the channel bits of the channel signal with a second clock frequency equal to twice the first clock frequency and a logic circuit for converting the authorized source words into the associated channel words, the logic circuit having three inputs which are connected to three consecutive cells $X_1$, $X_2$, $X_3$ of the first shift register, two inputs connected to a first and second cell $Y_1$, $Y_2$, respectively, of the second shift register and two outputs connected to third and fourth cells $Y_3$, $Y_4$, respectively, of the second shift register, and the logic circuit being arranged for applying two logic values $Y_3$ and $Y_4$, respectively, to the third and fourth cells $Y_3$, $Y_4$, respectively, of the second shift register in accordance with the algorithms $$y_3 = \bar{y}_1\bar{y}_2\bar{x}_1\bar{x}_2\bar{x}_3 + x_1x_2$$

$$y_4 = \bar{x}_2\bar{x}_1y_1 + \bar{y}_1\bar{y}_2x_1$$

$x_1$, $x_2$, $x_3$, $y_1$, $y_2$ being the logic values of the data and channel bits present in, respectively, the relevant shift register cells $x_1$, $x_2$, $x_3$, $y_1$, $y_2$, is characterized in that the arrangement comprises a generator circuit for at least inserting a data bit "0" into the source signal at the starting instant of a desired synchronizing word contiguously to the last data bit preceding this synchronizing word, and generator means for inserting the synchronizing word into the channel signal.

A preferred embodiment of such an arrangement is characterized in that the generator circuit is arranged for inserting a pattern of data bits "01" into the source signal at the starting instant of a desired synchronizing word.

A further preferred embodiment of such an arrangement is characterized in that the generator means comprise, coupled to the first shift register, a generator for inserting into the source signal a fixed pattern of data bits intended to obtain the synchronizing word, and a control circuit, arranged between these generator means and the logic circuit, for modifying the algorithms of this logic circuit during the conversion of this fixed pattern of data bits into the channel bits of the synchronizing word in the channel signal. In this way, it is possible to effect the generation of the synchronizing word with a minimum amount of additional electronics.

An arrangement for decoding a channel signal obtained in accordance with the method according to the invention, is characterized in that the arrangement comprises a synchronizing word detector which is arranged for at least detecting a sequence of nine channel bits having logic value "0" and supplying a detection signal in response thereto.

A preferred embodiment of such an arrangement which comprises a shift register for storing consecutive channel bits with the clock frequency of the channel signal and a logic circuit having six inputs which are connected to six cells $Z_1$ to $Z_6$ of this shift register for storing the logic values of six consecutive channel bits of the channel signal, and an output for supplying the source signal, the logic circuit being arrangement for supplying a logic value w at the output in accordance with the algorithm:

$$W = \bar{y}_2\bar{y}_4 + y_1\bar{y}_4 + y_3\bar{y}_6$$

wherein $y_1$ to $y_6$ are the logic values of the channel bits in the relevant cells $Z_1$ to $Z_6$ of the shift register, is characterized in that the logic shift register comprises at least nine cells for storing nine consecutive channel bits and that the synchronizing word detector comprises a logic circuit having at least nine inputs coupled to the nine cells of the shift register.

Finally, a record carrier which is provided with a binary recording signal obtained with the aid of the method according to the invention, is characterized in that the stored signal contains synchronizing words which are characterized by a spacing between two consecutive signal transitions equal to 5 data bits cells.

DESCRIPTION OF THE DRAWING

The invention will now be described in greater detail, by way of example, with reference to the drawings, in which.

DESCRIPTION OF THE PREFERRED EMBODIMENT

Figure 1:
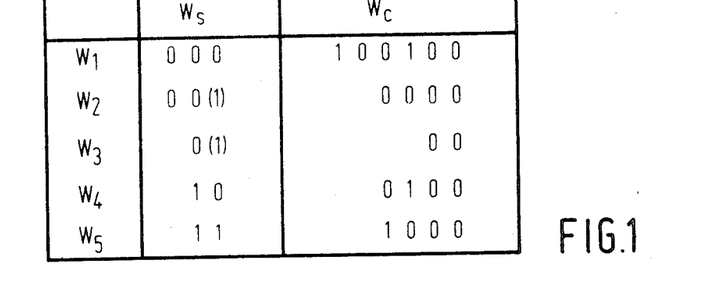
FIG. 1 shows the code rule.

FIG. 1 shows, in the form of a Table, the encoding rule used in the method according to the invention. According to this encoding rule, five authorized words $W_1$ to $W_5$ are distinguished in a binary source signal supplied, these words $W_S$ having different lengths, namely word $W_1$ has a length of 3 data bits, word $W_3$, a length of 1 data bit and the words $W_2$, $W_4$ and $W_5$, a length of 2 data bits. The 1 between brackets in the Table $W_S$ for the words $W_2$ and $W_3$ designates that the relevant words 00 and 0, respectively, are only accepted if the data bit subsequent to this word has the logic value "1". During the encoding operation, each source word $W_S$ is converted into the associated channel word $W_c$, each data bit of the source word $W_S$ resulting, as is evident from the Table, in two channel bits of the channel word $W_c$.

Figure 2:
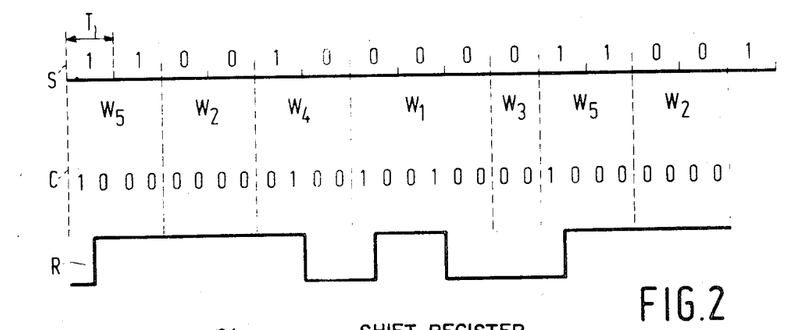
FIG. 2 illustrates the conversion of the source signal bit stream into the bit stream of the channel signal.

To illustrate this encoding rule, FIG. 2 shows, on the basis of an example of a source signal S, the conversion in accordance with this encoding rule into a channel signal C. The source signal S is divided into consecutive words of the authorized types $W_1$ to $W_5$, inclusive. The bit stream chosen, by way of example, then results in the sequence of word types $W_1$ to $W_5$ inclusive, shown in the example. Each of the source words distinguishable in the bit stream is converted into the associated channel word $W_c$ in accordance with the Table of FIG. 1, which results in the channel signal C of in FIG. 2. Thereafter, this channel signal C is modulated in accordance with the what is commonly referred to as the non-return-to-zero (NRZ) modulation, which produces the signal R, which is then recorded on, for example, a record carrier.

This registration signal R has the following properties:

1. The minimum spacing between two consecutive edges is 1.5 T, T being the length of one data bit of the source signal S.
2. The maximum distance between two consecutive edges is 4.5 T, which is small enough to ensure a self-clocking system.
3. The decoding time window is 0.5 T, which is still long enough to enable reliable operation, also when a record carrier is reproduced.

Figures 3, 4:
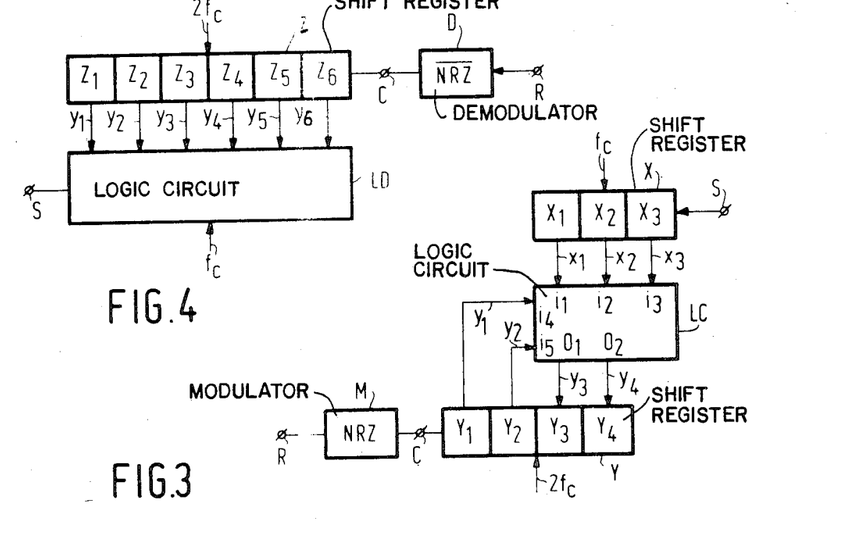
FIG. 3 illustrates an encoding arrangement.
FIG. 4 illustrates a decoding arrangement.

The great advantages of this encoding method resides, however, in the simplicity of the electronics required for coding and decoding and the error propagation, which will be demonstrated with reference to the encoding arrangement shown in FIG. 3 and the decoding arrangement shown in FIG. 4.

The encoding arrangement shown in FIG. 3 comprises a shift register X, whose input receives the source signal S which is passed through this shift register X at the clock rate $f_c$, corresponding to the bit rate of the source signal S. It is sufficient for this shift register X to comprise only three cells $X_1$ to $X_3$ for storing three consecutive data bits of the source signal S. These three cells $X_1$, $X_2$, $X_3$ are connected to three inputs $i_1$, $i_2$, $i_3$ of a logic circuit LC for applying to this logic circuit LC the logic values $x_1$, $x_2$, $x_3$ of the data bits of the source signal S, which bits are contained in these cells $X_1$, $X_2$, $X_3$.

The encoding arrangement further comprises a second shift register Y having four cells $Y_1$ to $Y_4$ in which the information present is shifted at the clock frequency $2f_c$. This clock signal $2f_c$ for shift register Y is, of course, synchronized with the clock signal $f_c$ for the shift register X. The cells $\bar{y}_1$ and $y_2$ are connected to two inputs $i_4$ and $i_5$ of the logic circuit LC for applying thereto the logic values $y_1$ and $y_2$ of the channel signal bits present in these cells $Y_1$ and $Y_2$. In addition, two outputs $o_1$ and $o_2$ of the logic circuit LC are connected to the cells $Y_3$ and $Y_4$ of the shift register Y for storing in these cells the logic values $y_3$ and $y_4$ generated by the logic circuit LC for the relevant bits of the channel signal.

Consequently, the logic circuit LC derives the logic values $y_3$ and $y_4$ (the channel bits associated with the data bit $x_1$) for the bits in the cells $Y_3$ and $Y_4$ from the logic values $x_1$, $x_2$, $x_3$ of the data bits of the source signal in the cells $X_1$, $X_2$, $X_3$ of the shift register X and the logic values $y_1$ and $y_2$ (the channel bits already generated and associated with the data bit preceding $x_1$) of the bits of the channel signal in the cells $Y_1$ and $Y_2$ of the shift register Y, more specifically in accordance with the algorithms:

$$y_3 = \bar{y}_1 \bar{y}_2 \{\bar{x}_1 \bar{x}_2 \bar{x}_3 + x_1 x_2\}$$

$$y_4 = x_2 \{\bar{x}_1 y_1 + \bar{y}_1 \bar{y}_2 x_1\}$$

These two algorithms automatically provide the conversion, shown in FIGS. 1 and 2, of the source signal S into the channel signal C. As the logic values $y_1$ and $y_2$ are still undefined when the first three data bits of a source signal S are supplied, it is necessary to introduce an initial condition therefor. It is sufficient, for this purpose, to use the logic value "0" in the two cells $Y_1$ and $Y_2$ of the shift register Y.

The channel signal C obtained at the output of the shift register Y is then modulated, in known manner, in the modulator M in accordance with the NRZ method which results in the registration signal R shown in FIG. 2.

The decoding arrangement shown in FIG. 4 comprises, in the first place, a NRZ-demodulator D for converting the applied registration signal R of FIG. 2 into the channel signal C. This channel signal C is applied to a shift register Z, which does not require more than six cells $Z_1$ to $Z_6$, the channel signal C being stored therein at the clock frequency $2f_c$. These cells $Z_1$ to $Z_6$ are connected to the inputs of a logic circuit LD for applying to this circuit the logic values $y_1$ to $y_6$ of the channel signal bits present in these cells $Y_1$ to $Y_6$. With a clock frequency $f_c$, that is to say always after the bits of the channel signal C have been shifted through two cells of the shift register Z, this logic circuit LD derives from these logic values $y_1$ to $y_6$, the logic value W from a data bit of the source signal S in accordance with the algorithm:

$$W = \bar{y}_1 y_4 + y_1 \bar{y}_4 + y_3 \bar{y}_6$$

As a result thereof, the original source signal S is obtained again at the output of the logic circuit LD. In this decoding mode, the first data bit of the original source signal is not decoded, which generally is hardly objectionable. If so desired, this can be obviated in a simple way by applying to the shift register Z as an additional condition, in advance of the bits of the channel signal, two bits having the logic value "0", so that, as an initial condition, $y_1 = y_2 = 0$ is entered and decoding starts at the first bit of the channel signal in cell $Z_3$ of the shift register Z.

It should be noted that the notations "0" and "1" used for the two logic values of the binary signals must not be considered as an absolute condition, as inverting the logic is of course alternatively possible.

From the decoding arrangement shown in FIG. 4, it is obvious that only a sequence of 6 channel bits of the channel signal are used for decoding. This implies that a faulty channel bit results in only three faulty data bits of the decoded signal S, so that the error propagation of the code opted for is very small.

Figure 5:
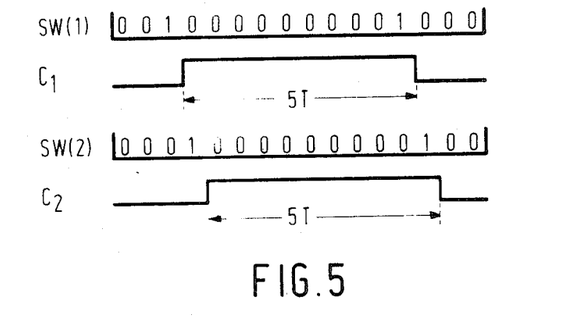
FIG. 5 shows two possible synchronizing words according to the invention.

FIG. 5 shows two possible embodiments of the synchronizing word used in accordance with the invention. Both synchronizing words SW(1) and SW(2) start with two channel bits having logic value "0" and end with two channel bits having logic value "0". Therebetween each of the two synchronizing words contains a sequence of nine bits having the logic value "0" placed between two logic "ones". Consequently, after NRZ-modulation, each of the two synchronizing words has a signal variation as shown, two consecutive edges being spaced apart by 5T. As this period of time 5T does not occur as such in the encoding system, this criterion renders an unambiguous recognition of the synchronizing word possible.

On insertion of the synchronizing word into the channel bit stream, it must also be taken into account that because of the fact that during encoding, authorized words of different lengths are used, dividing the bit stream of the source signal need not be completed at the beginning of the synchronizing word. In other words, there is no need to know now already definitely to which type of word the last data bit or the two last data bits of the source signal preceding the synchronizing word, belong.

Figure 6:
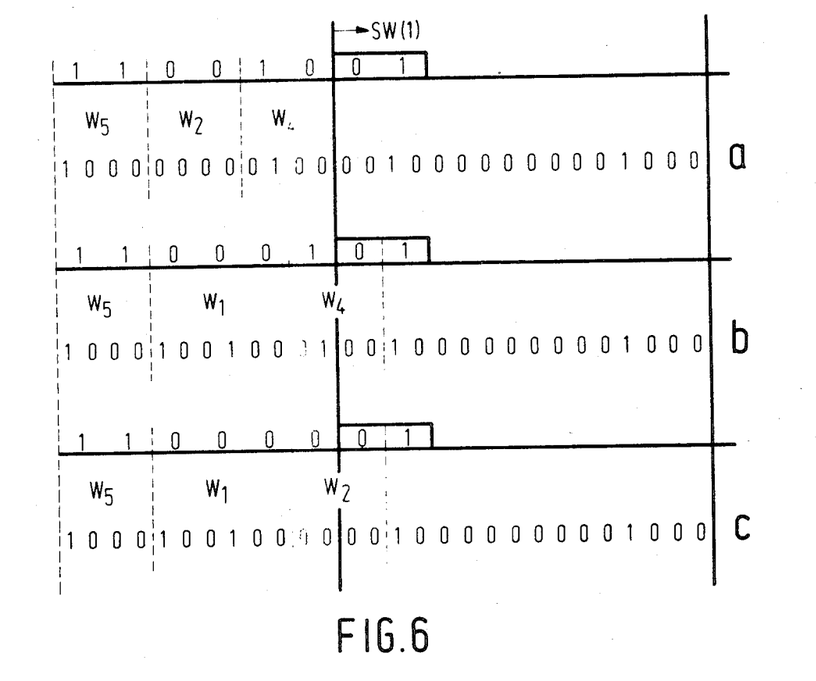
FIG. 6 shows the mode of insertion of these synchronizing words.

To effect unambiguous encoding of also these data bits, a set of pseudo-data bits "$0_1$", which, as regards time, correspond to the first channel bits of the synchronizing word, are inserted in accordance with the invention in the source signal. All this is illustrated by FIG. 6.

The data bit pattern assumed in FIG. 6a is such that the last identified authorized word $W_4$ in the source signal just ends at the beginning of the synchronizing word. If, for the encoding operation, a coding arrangement was used and arranged for recognizing the authorized words $W_1$ to $W_5$ and which, after recognition of an authorized word, directly generates the associated channel word, then no addition of the pseudo-data bits "01", as shown encircled in the synchronizing word SW(1), would not be necessary. If, however, the encoding arrangement of FIG. 3 is used, then it will be obvious that for converting the two data bits preceding the beginning of the synchronizing word, two data bits are required at the beginning of the synchronizing word.

This is certainly the case with the patterns of data bits in accordance with FIGS. 6b and c, which are shown by way of example. In FIG. 6b the code for the last data bit preceding the synchronizing word can only be determined by adding the first pseudo-data bit and, in FIG. 6c, by the addition of both data bits, which can be simply seen from the fact that the last authorized code words $W_4$ and $W_2$, respectively, overlap the synchronizing word.

The choice of the two pseudo-data bits is governed by the various requirements imposed on the code. The choice of a logic "0" for the first pseudo-data bit accomplishes that data bits preceding the synchronizing word result in channel bits which, together with the pattern of the channel bits of the synchronizing word, continue to satisfy the requirement that not more than eight consecutive "zeros" may occur. In other words, it is ensured that also at the transition of the channel bits to the synchronizing signal, the requirement as regards the maximum permissible distance between consecutive transitions in the registration signal continues to be satisfied.

The choice of a logic "1" for the second pseudo-data bit accomplishes that, in accordance with the code rules used, the first two channel bits of the synchronizing word would always be "00" and, consequently, would correspond with the first two actually used channel bits of the synchronizing word, which facillitates the encoding operation as will become apparent hereinafter.

Figure 7:
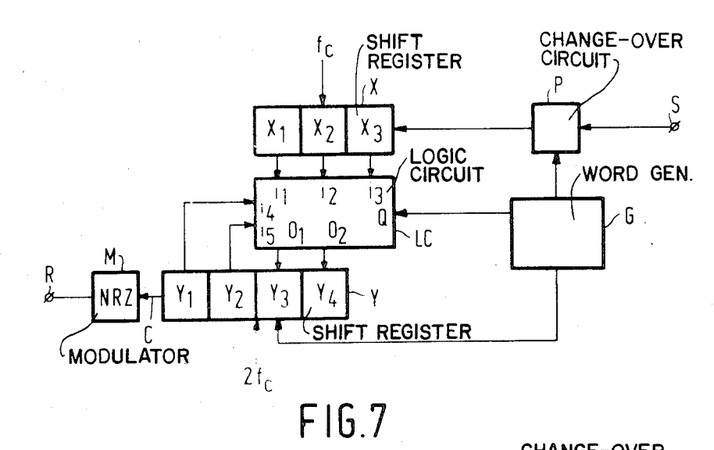
FIGS. 7 and 8 show two possible embodiments of the encoding arrangement.

FIG. 7 shows a first embodiment of an encoding arrangement according to the invention. This arrangement is predominantly identical to the arrangement shown in FIG. 3. A generator G for generating the synchronizing word and the pseudo-data bits has been added. This generator G is connected to a change-over circuit P which, under the control of this generator G, interrupts the connection between the shift register X and the input terminal and connects, instead, the generator G to this shift register X for adding the two pseudo-data bits contiguously to the last data bit of the source signal S preceding the synchronizing word.

After a delay of three data bits, so after the last data bit of the source signal has been encoded, the generator G renders the logic circuit IC inoperative via the control input Q and simultaneously the synchronizing word pattern is inserted into the channel signal via an input of the cell $Y_3$ of the shift register Y. In this construction of the encoding arrangement, the synchronizing word is consequently inserted directly into the channel bit sequence.

Figure 8:
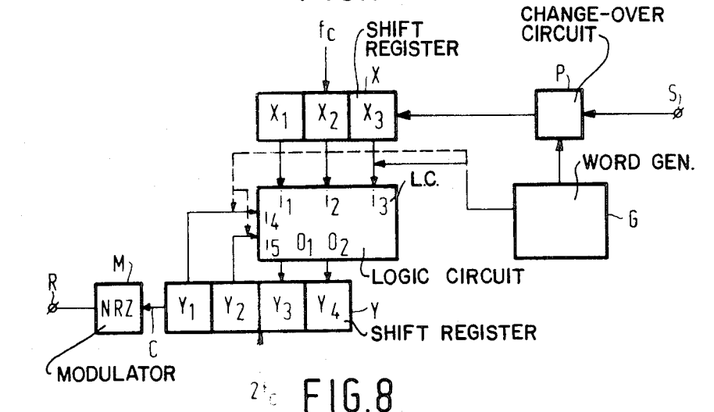
Figure 9:
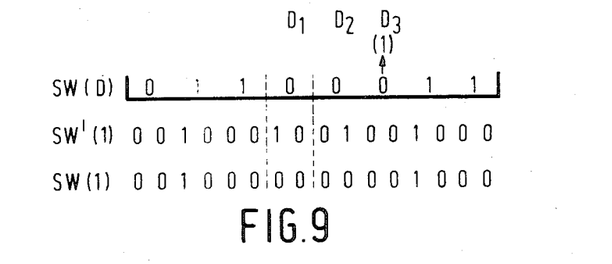
FIGS. 9 to 12 illustrate the mode of generation of the synchronizing words at the arrangement shown in FIG. 8.

It is, however, alternatively possible to obtain this desired synchronizing word by inserting a specific pattern of eight data bits into the source signal while briefly modifying the code rules, as will be demonstrated with reference to FIGS. 8 and 9.

The encoding arrangement of FIG. 8 is predominantly of the same construction as the encoding arrangement of FIG. 7. The generator G for creating a synchronizing word in the channel signal does not, however, apply this word directly to the shift register Y, but rather, applies a data synchronizing word to the shift register X, which data synchronizing word is then converted, via the logic circuit LC, into the desired synchronizing word for the channel signal. As the synchronizing word does not satisfy the normal code rules, it is necessary to adapt the encoding logic during the conversion of the data synchronizing word into the channel synchronizing word. It has, however, been found that this adaptation need only be very limited, as will be demonstrated with reference to FIG. 9.

FIG. 9 shows a first example of a data synchronizing word SW(D). As will be obvious, the first two data bits of this word correspond to the two pseudo-data bits mentioned in the foregoing. The first three data bits of this word are unambiguously encoded in accordance with the desired synchronizing word SW(1). When the subsequent three data bits $D_1$ to $D_3$ were encoded in the normal way, a channel bit pattern would, however, be obtained (SW'(1)) which is not in agreement with the desired pattern. It is, however, very simple to remedy this by changing the data bit $D_3$ into a logic "1" during encoding of the two channel bits associated with the data bit $D_3$. Instead of considering, during encoding, the data bits $D_1$ to $D_3$ to be a word of the type $W_1$, the data bits $D_1$ and $D_2$ are considered to be a word of the type $W_2$ and the data bit $D_3$ as a word of the type $W_3$ as a result of this brief change of $D_3$. All this results in the desired synchronizing word being generated by the logic circuit LC.

This brief change in the data bit $D_3$ during encoding of the data bit $D_1$, can be implemented in a very simple way and can be effected by having the generator G apply a logic "1" to the input $i_3$ of the logic circuit LC during this desired period.

Figure 10:
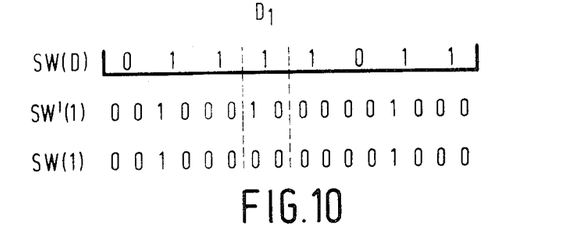

FIG. 10 shows an alternative data synchronizing word SW(D). When the normal code words were used, this would result in the synchronizing word SW'(1). However, by applying a logic "1" to the input $i_4$ or $i_5$ of the logic circuit LC during encoding of the data bit $D_1$ (see the broken line in FIG. 8), the desired pattern of the synchronizing word SW(1) is obtained.

Figure 11:
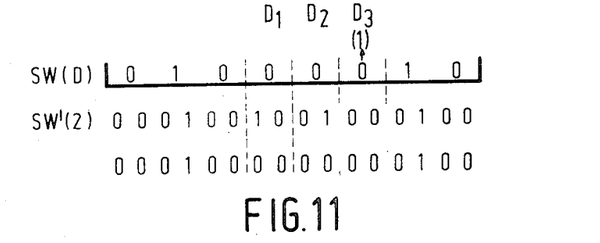
Figure 12:
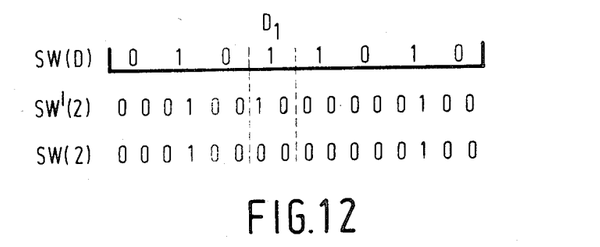

FIGS. 11 and 12 show two possibilities to obtain the synchronizing word SW(2) of FIG. 5 from a data synchronizing word. Adapting the encoding rules at the data synchronizing word of FIG. 11, fully corresponds to adapting the coding rules described with reference to FIG. 9, and adapting the encoding rules of the data synchronizing word of FIG. 12, fully corresponds to the encoding rule adaptation described with reference to FIG. 10.

Figure 13:
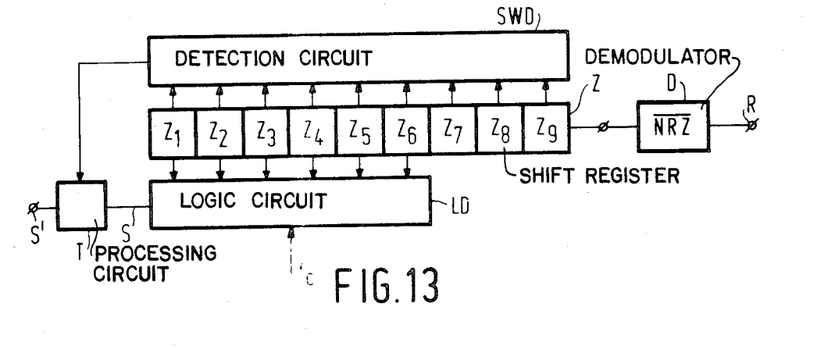
FIG. 13 shows an embodiment of the decoding arrangement.

Finally, FIG. 13 shows a simple implementation of the detection of the synchronizing word in the decoding arrangement of FIG. 4. The arrangement corresponds, to a very significant extent, to the arrangement shown in FIG. 4 with the exception that the shift register is extended by three cells $Z_7$ to $Z_9$. With the aid of a detection circuit SWD, it is detected whether the contents of all cells $Z_1$ to $Z_9$ is a logic "0", which is characteristic of a synchronizing word. This detection circuit SWD then applies a detection signal to the processing circuit T in which the general timing and such like of the signal processing operation is effected. It is, of course, alternatively possible to use a synchronizing word detector which is fully adapted to this synchronizing word, that is to say, a detector having 16 inputs connected to a shift register having 16 cells, and producing a detection signal as soon as the logic values of the channel bits in these 16 cells correspond to the synchronizing word.

It will be obvious that the invention is in no way limited to the embodiments shown, but that alternative circuit constructions are within the scope of the inventive idea.

What is claimed is:

1. A method of converting a stream of data bits of a binary source signal into a stream of channel bits of a binary channel signal in a transmission system, more specifically, a system for recording and reproducing a recording signal on a record carrier, the bit stream of the source signal being divided into a contiguous sequence of five authorized source words in accordance with the following Table, which authorized source words are converted into the associated channel words of the Table:

| source words | channel words |
| --- | --- |
| 10 | 0100 |
| 11 | 1000 |
| 0(1) | 00 |
| 00(1) | 0000 |
| 000 | 100100 | characterized in that during this encoding operation, a synchronizing word is generated formed by 16 channel bits, the two first and the two last channel bits of this synchronizing word being a logic "0" and the intermediate pattern of channel bits comprises only two logic "ones" separated by nine "zeros", and that in order to obtain an unambiguous conversion of the two source signal data bits preceding a synchronizing word, the beginning of a synchronizing word in the stream of data bits of the source signal is indicated by the insertion of at least one source bit in the form a logic "0".

2. A method as claimed in claim 1, characterized in that in order to obtain an unambiguous conversion of the two source signal data bits preceding a synchronizing word, the beginning of a synchronizing word in the stream of data bits of the source signal is indicated by the insertion of a set of source bits in the form of a logic "0" followed by a logic "1".

3. A method as claimed in claim 1 or 2, characterized in that the synchronizing word is formed by the channel bit pattern 0010000000001000.

4. A method as claimed in claim 1 or 2, characterized in that the synchronizing word is formed by the channel bit pattern 0001000000000100.

5. A method as claimed in claim 1 or 2, characterized in that the synchronizing word is obtained by inserting a fixed pattern of eight data bits into the source signal and by briefly modifying the conversion rules during the conversion of this fixed pattern of data bits of the source signal into the desired pattern of the synchronizing word of the channel signal.

6. An arrangement for converting a stream of data bits of a binary source signal into a stream of channel bits of a binary channel signal in a transmission system, the bit stream of the source signal being divided into a contiguous sequence of five authorized source words which are converted into the associated channel words, the arrangement comprising:

a first shift register for storing and shifting the data bits of the source signal at a first clock frequency, a second shift register for storing and shifting the channel signal channel bits at a second clock frequency equal to twice the first clock frequency, a logic circuit for converting the authorized source words into the associated channel words, the logic circuit having three inputs connected to three consecutive cells $X_1$, $X_2$ $X_3$ of the first shift register, two inputs connected to a first and a second cell $Y_1$, $Y_2$, respectively, of the second shift register, and two outputs connected to a third and fourth cell $Y_3$, $Y_4$, respectively, of the second shift register, the logic circuit applying two logic values $Y_3$ and $Y_4$, respectively, to the third and fourth cells $Y_3$, $Y_4$, respectively, of the second shift register in accordance with the algorithms:

$$y_3 = \bar{y}_1 \bar{y}_2 \{\bar{x}_1 \bar{x}_2 \bar{x}_3 + x_1 x_2\}$$

and $$y_4 = \bar{x}_2 \{\bar{x}_1 y_1 + \bar{y}_1 \bar{y}_2 x_1\}$$

$x_1$, $x_2$, $x_3$, $y_1$, $y_2$ being the logic values of the data and channel bits, respectively, present in the relevant shift register cell $X_1$, $X_2$, $X_3$, $Y_1$, $Y_2$, characterized in that the arrangement comprises a generator circuit for at least inserting a data bit "0" into the source signal at the starting moment of a desired synchronizing word contiguous to the last data bit preceding this synchronizing word, and generator means for inserting the synchronizing word into the channel signal.

7. An arrangement as claimed in claim 6, characterized in that the generator circuit inserts a pattern of data bits "01" into the source signal at the starting moment of a desired synchronizing word.

8. An arrangement as claimed in claim 6 or 7, characterized in that the generator means comprise a generator coupled to the second shift register for directly inserting the synchronizing word into the channel signal.

9. An arrangement as claimed in claim 6 or 7, characterized in that the generator means comprise a generator coupled to the first shift register for inserting into the source signal a fixed pattern of data bits intended to obtain the synchronizing word, and a control circuit arranged between the generator means and the logic circuit for modifying the algorithms of this logic circuit during the conversion of the fixed pattern of data bits into the channel bits of the synchronizing word in the channel signal.

10. A decoding arrangement for decoding a channel signal obtained in accordance with the arrangement as claimed in claim 6, the decoding arrangement comprising a decoding unit for converting the channel signal into the source signal, characterized in that the arrangement comprises a synchronizing word detector for detecting a sequence of nine channel bits having a logic value "0" and for producing a detection signal in response thereto.

11. A decoding arrangement as claimed in claim 10, the decoding arrangement comprising a shift register for storing six consecutive channel bits at the clock frequency of the clock signal and a logic circuit having six inputs, connected to six cells $Z_1$ to $Z_6$ of this shift register for storing the logic values of six consecutive channel bits of the channel signals, and an output for supplying the source signal, the logic circuit supplying a logic value w at the output in accordance with the algorithm:

$$w = \bar{y}_1 y_4 + y_1 \bar{y}_4 + y_3 \bar{y}_6$$

$y_1$ to $y_6$ being the logic values of the channel bits in the relevant cells $Z_1$ to $Z_6$ of the shift register, characterized in that the shift register comprises at least nine cells for storing nine consecutive channel bits, and the synchronizing word detector comprises a logic circuit having at least nine inputs coupled to the nine cells of the shift register.

* * * * *